United States Patent [19]

Thompson

[11] Patent Number: 5,020,123
[45] Date of Patent: May 28, 1991

[54] APPARATUS AND METHOD FOR IMAGE AREA IDENTIFICATION

[75] Inventor: Timothy J. Thompson, Howell, N.J.

[73] Assignee: AT&T Bell Laboratories, Murray Hill, N.J.

[21] Appl. No.: 562,292

[22] Filed: Aug. 3, 1990

[51] Int. Cl.$^5$ .............................................. G06K 9/20
[52] U.S. Cl. ........................................ 382/61; 382/14
[58] Field of Search ...................... 382/10, 14, 16, 19, 382/30, 8, 44–45, 61; 358/106–107

[56] References Cited

U.S. PATENT DOCUMENTS

| | | | |
|---|---|---|---|
| 4,668,982 | 5/1987 | Tinnerino | 358/101 |
| 4,773,099 | 9/1988 | Bokser | 382/14 |
| 4,790,028 | 12/1988 | Ramage | 382/44 |
| 4,842,370 | 6/1989 | Brenner et al. | 382/10 |
| 4,893,346 | 1/1990 | Bishop | 382/14 |
| 4,926,491 | 5/1990 | Maeda et al. | 382/14 |

*Primary Examiner*—Stephen Brinich
*Attorney, Agent, or Firm*—Thomas Stafford

[57] ABSTRACT

A flexible technique that is robust in the presence of noise and distortion is disclosed for locating and utilizing fiducial markings to locate predetermined areas within an image. Initially, a set of candidate markings is determined, one marking from within each of a plurality of predesignated areas of a scanned image. Thereafter, an estimate of a set of image distortion factors relative to an ideally registered image of the same type as the scanned image is derived. Predicted locations for the fiducial markings are derived using this estimated set of image distortion factors. If the difference in location between the actual location of any candidate markings and its predicted location is greater than a predetermined threshold, at least one such candidate is removed from the set of candidate markings. The estimation and removal processes are repeated, utilizing the new current set of candidate fiducial markings until all remaining candidate markings are within a predetermined distance of their predicted locations. Predetermined areas within the scanned image can thereafter be accurately located by combining the known location of the area within an ideal image with the final estimated set of image distortion factors. The predicted location may be further improved by using a weighted average of the ideal versus the actual fiducial marking differences, to account for local non-linear variations.

16 Claims, 4 Drawing Sheets

APPARATUS AND METHOD FOR IMAGE AREA IDENTIFICATION

TECHNICAL FIELD

This invention relates to image processing and, more particularly, to accurately locating predefined areas within an image.

BACKGROUND OF THE INVENTION

Prior image area identification systems were typically designed to function with fiducial markings that were clearly delineated and easily distinguishable from other image information. The fiducial markings are used to determine the registration of the document for the purpose of accurately determining the location of predetermined positions on the image. The fiducial markings employed may be markings specifically employed for the recognition process or they may be known easily identifiable objects that comprise a part of the image. These fiducial markings are typically regular patterns placed along the edges or in the corners of the image being scanned and suffer the disadvantage of obtrusiveness. Furthermore, these prior systems perform registration of an image under the assumption that the scanned image will be largely undistorted and free of noise. However, distortions and modifications to a scanned image are common. These distortions can be introduced either on the original item being scanned, via the scanning process or in transmission of the scanned image. Exemplary causes of such distortions are smudges on the original item being scanned, a slipping feed mechanism, a dirty scanner, or errors in facsimile (FAX) transmission over a noisy telephone line.

In some instances, distortions to the scanned image are non-linear. This type of distortion can arise, for example, if the surface being scanned is being turned during the scanning process. A single skew and offset correction is insufficient to correct for such a distortion. One prior system suggests using multiple fiducial markings spaced throughout the image surface to compensate for non-linear distortions introduced in the scanned image with respect to an ideal image by using piecewise linear approximation techniques. However, this system requires a controlled second scan of the actual image to generate a compensated image. It is impossible to obtain such a controlled second scan in many image scanning applications. Also, use of this prior system is limited to applications wherein all fiducial markings are present in the scanned image and wherein all markings are successfully detected. Furthermore, this prior system is unable to function satisfactorily in the event that a particular area of the image is falsely detected as a fiducial marking.

SUMMARY OF THE INVENTION

The difficulties with prior image area identification systems are overcome, in accordance with an aspect of the invention, by employing an iterative process to derive a set of fiducial markings and image distortion factors from a candidate set of markings. Initially, a set of candidate markings is determined, one marking from within each of a plurality of predesignated areas of the scanned image. Thereafter, an estimate of a set of image distortion factors is derived. This estimate is based on the current set of candidate fiducial markings and is calculated relative to an ideally registered image of the same type as the scanned image. Predicted locations for the fiducial markings are derived using this estimated set of image distortion factors and the known locations of the fiducial markings in the ideally registered image. If the difference in location between the actual location of any candidate marking and its predicted location is greater than a predetermined threshold, at least one such candidate is removed from the set of candidate markings to form a new current set of candidate markings. The estimation and removal processes are repeated, utilizing the new current set of candidate fiducial markings until all remaining candidate markings are within a predetermined distance of their predicted locations. Predetermined areas within the scanned image can thereafter be accurately located by combining the known location of the area within an ideal image with a final estimated set of image distortion factors. The predicted location may be further improved by using a weighted average of the ideal versus the actual fiducial marking differences, to account for local non-linear variations.

BRIEF DESCRIPTION OF THE DRAWING

In the Drawing:

Shown in FIG. 1, in simplified block diagram form, is an exemplary system for locating areas of an image and extracting information therefrom;

Figure 2:
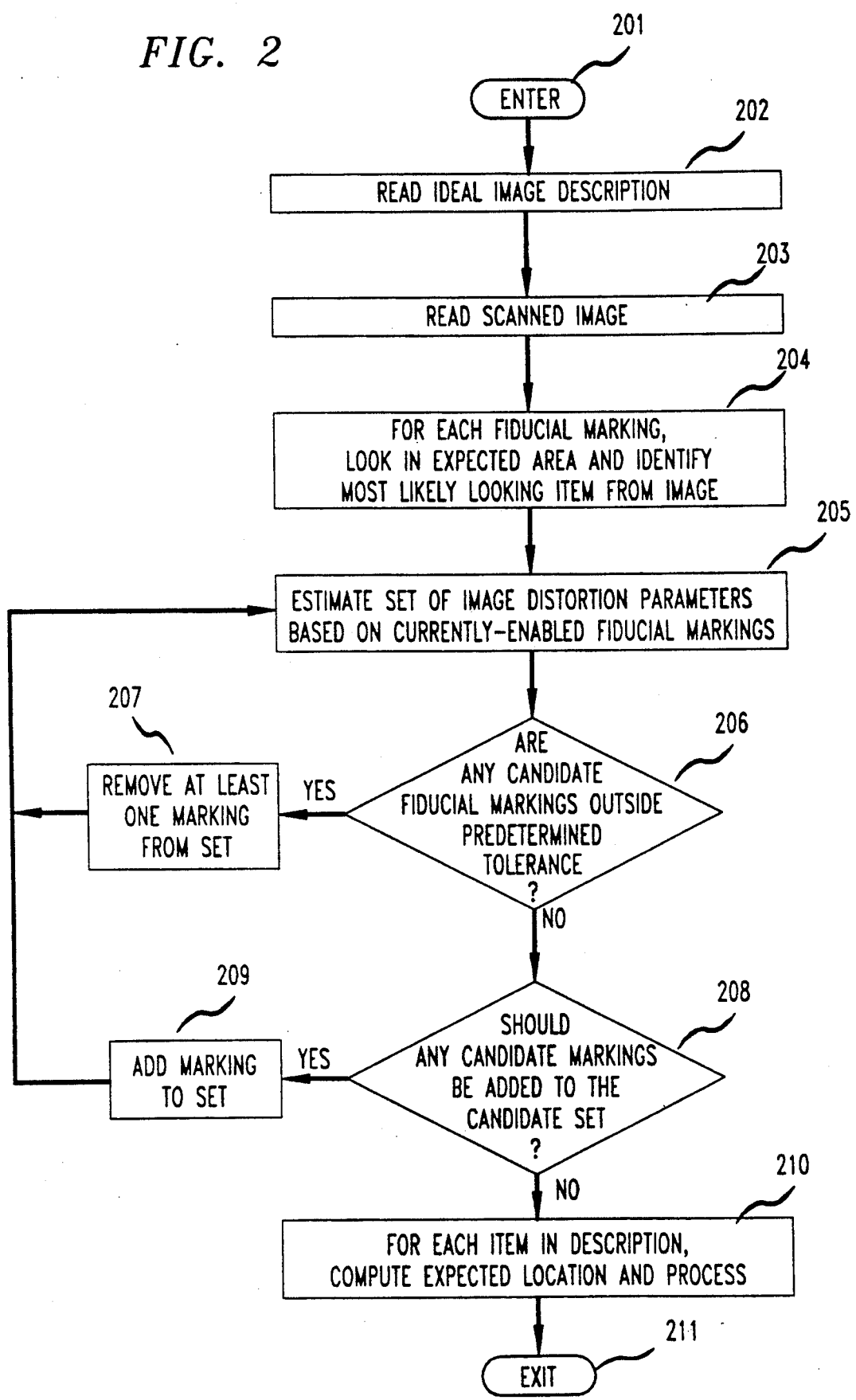
Figure 3:
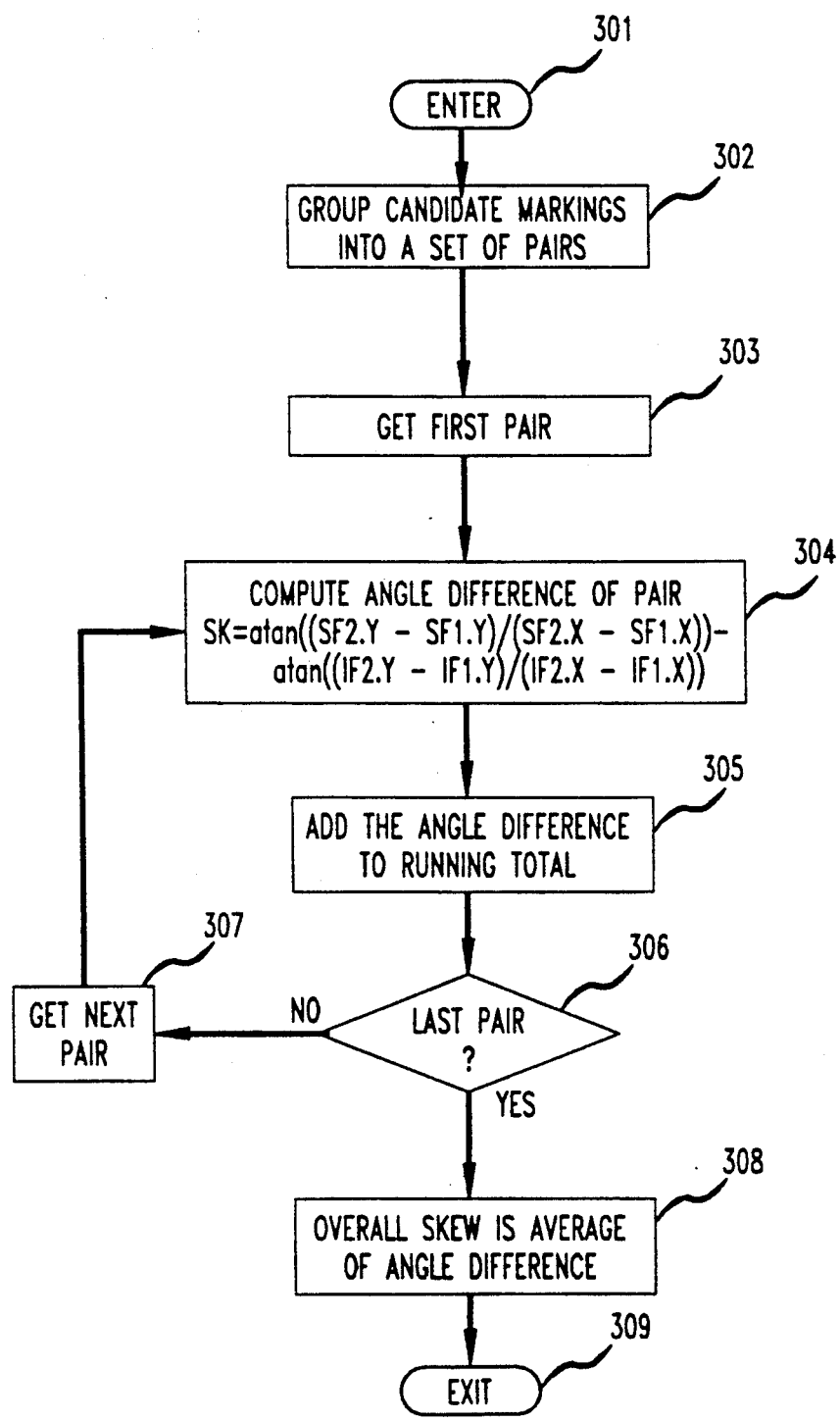

Shown in FIG. 2, in flow chart form, is an exemplary implementation of a method for locating areas of an image and extracting information therefrom;

FIG. 3 shows an exemplary method for calculating overall image skew; and

Figure 4:
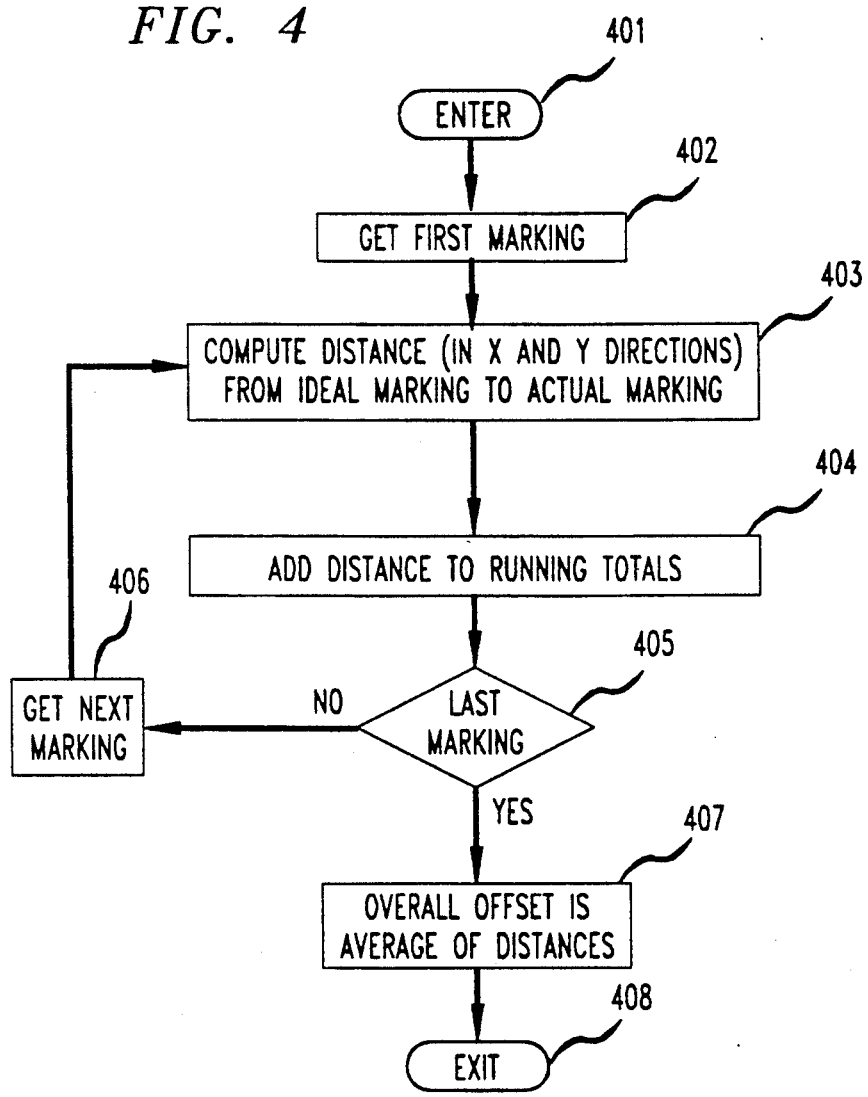

Shown in flow chart form, in FIG. 4 is an exemplary method for computing overall image offset.

DETAILED DESCRIPTION

Figure 1:
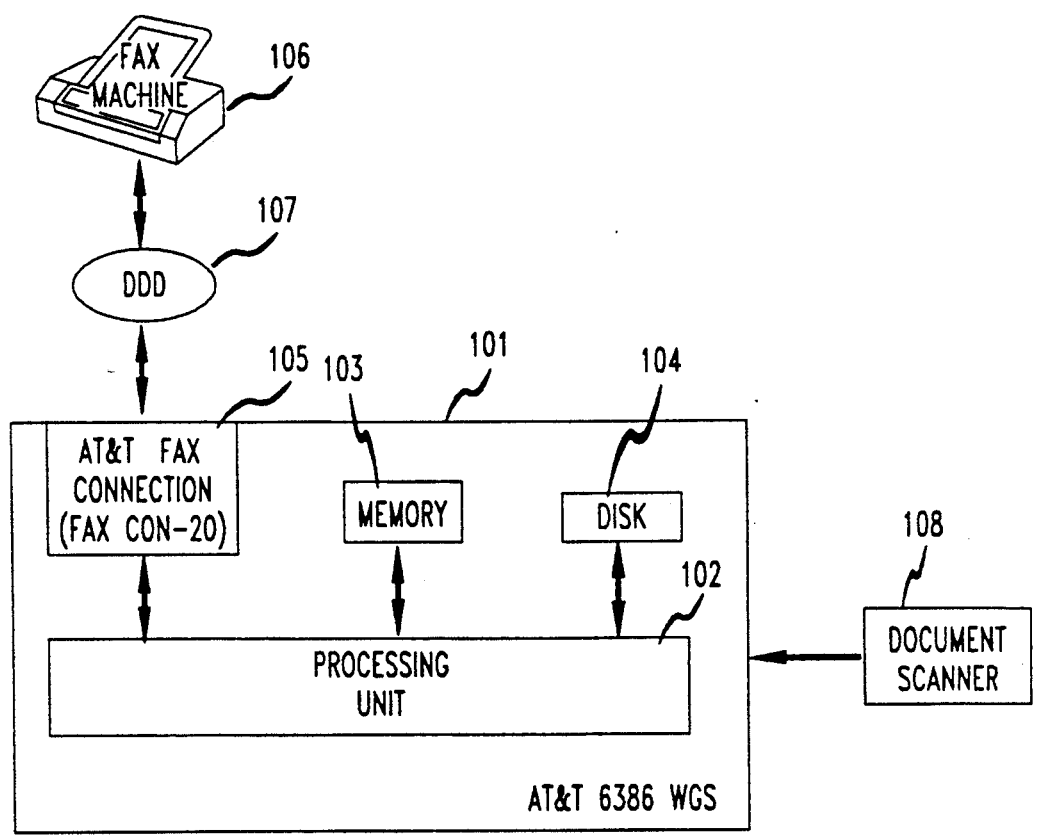

Shown in FIG. 1, in simplified block diagram form, is an exemplary system for locating areas of an image and extracting information therefrom. The system includes a computer equipped with a facsimile (FAX) board and a mechanism for obtaining images. In this example, the computer is AT&T 6386 Work Group System (WGS) 101, which is further comprised of processing unit 102, memory 103 and disk storage unit (DISK) 104. Included as an internal peripheral is FAX board 105, an AT&T Fax Connection (FAX CON-20). FAX board 105 is connected over direct dial network (DDD) 107, i.e., the public telephone network, to facsimile (FAX) machine 106. FAX board 105 can receive images scanned and transmitted by FAX machine 106. Also attached to AT&T 6386 Work Group System (WGS) 101 for supplying a scanned representation of images is optional document scanner 108. All the above mentioned components are known and commercially available.

Shown in FIG. 2, in flow chart form, is an exemplary implementation of the fiducial marking location and utilization routine. The routine is entered in step 201 when it is determined that the registration of an image is to be determined. Typically, this is for purposes of determining the locations of particular predetermined areas of the image. Such a determination may be made automatically, e.g., upon reception of a facsimile transmission by FAX board 105 (FIG. 1). Alternatively, a user could manually make such a determination by entering an appropriate command line at the keyboard of AT&T 6386 Work Group System (WGS) 101 (FIG. 1). In step 202 a description of the ideally registered image is read into memory 103 (FIG. 1). This description contains at least the positions of the expected fiducial markings and the positions of other areas on the image to be identified. Typically, this description will be stored on DISK 104 (FIG. 1).

The appearance of each marking in an image is describable by a set of characteristics that define a marking style. Each marking has a predetermined style and the styles for each marking in the image need not be identical. One such style might be a bullet, i.e., a filled circle. Another such style might be a cross-hair. Therefore, a description of the characteristics of each marking to be found at each location may also be included in the description of an ideally registered image so that different markings of different styles can be employed within one image.

The data comprising a scanned image is read into memory 103 (FIG. 1) in step 203. Data comprising the scanned image may originate from several sources, including without limitation: DISK 104 (FIG. 1), FAX board 105, and optional document scanner 108 (FIG. 1). An images for which the locations of particular predetermined areas are to be identified may be supplied from any of several sources. Typically, an image may be scanned directly into memory, a scanned image may be received via a communications system or an image may be retrieved from a medium of mass storage.

For each fiducial marking described in an ideally registered image description, a predetermined area of the scanned image is searched, in step 204. The objective of the search is to find the marking most closely approximating the fiducial marking expected in that area based on a set of predefined characteristics. These characteristics typically include the shape of the expected marking and the expected location. The search area is centered on the expected location of the fiducial marking in the ideally registered image. The search area is then expanded from this center location by a predetermined amount. Within this search area all markings consisting of connected pixels of a predetermined type are identified. In this example, markings are comprised of black pixels. Thereafter, a candidate marking is selected based on a set of predetermined criteria. In one implementation, the marking selected is the marking most closely approximating the expected fiducial marking. In the case of a filled circular fiducial marking, i.e., a bullet, the determination of the marking most closely approximating the expected fiducial marking makes use of the aspect ratio of the collection of pixels, which should be approximately square, as well as the location of their center of gravity, which should be close to the center of the marking. Thereafter, the selected candidate fiducial marking is added to a set of candidate fiducial markings. In step 205, an estimate of a set of image distortion factors relative to the ideally registered image, is determined. In one implementation, the set of image distortion factors comprises overall image skew, scaling and rotation. Each image distortion factor may be calculated in a subroutine. Such subroutines are invoked in step 205. Routines for computing the overall image skew, scaling and rotation are described below.

Next, conditional branch point 206 tests if any of the candidate fiducial markings are outside a predetermined tolerance of their expected locations. If the test result in step 206 is YES, control is passed to step 207 which removes at least one marking from the set of candidate fiducial markings. In one implementation, the marking that is furthest from its expected location is removed from the set. Thus, a new current set of candidate fiducial markings is formed. Control is then passed back to step 205 which computes a new set of image distortion factors utilizing the new current set of candidate fiducial markings. If the test result in step 206 is NO, each of the candidate fiducial markings in the current set is within the predetermined tolerance of its expected location. No further elimination of candidate markings need take place. Control is passed to optional step 208 which tests, based on predetermined criteria, if any additional candidate markings should be added to the set of candidate fiducial markings. The test criteria for step 208 are implementation dependent.

Exemplary test criteria are the exceeding of a predetermined number of passes though the loop including step 208 or achieving a predetermined difference between the ideally registered image and the predicted image. These additional candidate markings may be markings that had a probability of being a fiducial marking but were not added to the set of candidate fiducial markings in step 204 or they may be previously rejected markings. Only markings from areas of the image for which there is currently no marking in the set of candidate fiducial markings are considered. Although markings that were previously members of the set of candidate fiducial markings and were removed may be added back to the set of candidate fiducial markings at this step, it is the implementor's responsibility to ensure that the method chosen for selection of the markings to be added and the criteria for determining if markings should be added do not result in an endless loop. In one such exemplary implementation, markings that were previously considered and were removed from the set of candidate fiducial markings are not reconsidered and the number of times step 208 can be executed is limited to the number of expected fiducial markings in the ideally registered image.

If the test result in step 208 is YES, control is passed to step 209 which actually adds the selected new candidate fiducial markings to the set of candidate fiducial markings. Control is then passed back to step 205 to calculate a new set of values for the set of image distortion factors. If the test result in step 208 is NO, control is then passed to step 210 in which the location of each area to be determined is computed using the current values of the set of image distortion factors. The routine is then exited via step 211.

The image scaling, relative to the ideally registered image, is computed in a preferred embodiment as follows. Initially, the outermost four (4) located fiducial markings are identified. It is especially important to note that the placement of these markings is not limited to the corners of the image. Rather, wherever the set of fiducial markings are placed on the image, so as to be unobtrusive, the four outermost markings in the scanned image will be identified. These outermost recognized markings are referred to as UPPERLEFT, UPPERRIGHT, LOWERLEFT and LOWERRIGHT. The corresponding locations of the outermost markings in the scanned image are UL, UR, LL and LR. Additionally, the corresponding positions of each marking in the ideally registered image are referred to as IUL, IUR, ILL, and ILR. The X coordinate of a point is represented by a ".X" suffix and the Y coordinate of a point is represented by a ".Y" suffix. The scale factor at the top of the image is $$FX1 = (IUR.X - IUL.X)/(UR.X - UL.X)$$

and the scale factor at the bottom of the page is $$FX2 = (ILR.X - ILL.X)/(LR.X - LL.X).$$

The scaling factor at an arbitrary Y coordinate is computed as $$FXATY(Y) = FX1 + (Y-UR.Y)*(FX2-FX1)/(UR.X-ULX).$$

Similar computations compute the scaling factor at an arbitrary X coordinate. The calculated scaling factors are employed to adjust all future calculations of points on the scanned image. For example, for an arbitrary point IP in the ideal image the predicted X coordinate in the scanned image would be $$PP.X = IP.X * FXATY(IP.Y).$$

As described above, each time a candidate fiducial marking is removed from the set of candidate fiducial markings, new scaling factors are calculated for the scanned image relative to the ideally registered image.

Overall image skew is computed according to an exemplary method outlined in flow chart form in FIG. 3. The routine is entered via step 301 from step 205 when it is necessary to compute overall image skew. In step 302 all the markings in the candidate set of fiducial markings are grouped into a set of pairs comprised of all unique pairings of markings. The routine iterates over each pair of markings remaining in the set of pairs. IF1 and IF2 refer to each marking of a pair of fiducial markings in the ideal image and SF1 and SF2 refer to each marking of the corresponding pair of fiducial markings in the scanned image. Step 303 obtains a first pair to begin calculations with. In step 304 the angle difference between the scanned and ideally registered markings is computed as $$SK = \text{atan}((SF2.Y-SF1.Y)/(SF2.X-SF1.X)) - \text{atan}(-(IF2.Y-IF1.Y)/(IF2.X-IF1.X)).$$

The computed angle difference is added to an angle difference running total in step 305. Thereafter, conditional branch point 306 tests to determine if the angle difference has been computed for the last pair of markings from the set of pairs. If the test result in step 306 is NO, control is passed to step 307 which obtains the next pair of markings from the set of pairs and passes control back to step 304. If the test result in step 306 is YES, control is passed to step 308 which computes the overall skew as the average of the angle differences by dividing the running total of angle differences by the number of pairs of markings originally in the set of pairs. The routine is then exited via step 309.

Shown, in flow chart form, in FIG. 4 is an exemplary method for computing overall image offset. The routine is entered via step 401 from step 205 when it is necessary to compute overall image offset. Step 402 obtains a first marking from the set of candidate markings. In step 403 the X and Y components of the distance from the marking in the set of candidate markings to its corresponding marking in the ideally registered image is computed. Methods for the computation of distance and the components thereof are well known. The computed distance components are added to a running total of the X and Y distance components in step 404. Thereafter, conditional branch point 405 tests to determine if the angle difference has been computed for the last pair of markings from the set of pairs. If the test result in step 405 is YES, control is passed to step 406 which obtains the next markings from the set of candidate markings and passes control back to step 403. If the test result in step 405 is YES, control is passed to step 407 which computes the average of the offsets by dividing the X and Y running totals by the number of markings in the set of candidate markings. The routine is then exited via step 408.

Once a final set of fiducial markings has been recognized, it is possible to take into account the distortion parameters calculated in order to predict where a given point in the ideally registered image will appear in the actual scanned image. Such a point may represent, for example, the corner of an area that is to be processed. When the distortion parameters consist of the overall skewing, scaling and offset of the image, as previously described, the X coordinate of the predicted point, PP, is computed from the ideal point, IP, according to the following equation in which CENTER is the center point of the scanned image, AO is the overall offset and TMP is a temporary variable to simplify notation.

$$TMP.X = (AO.X + IP.X * FXATY(IP.Y))$$

$$TMP.Y = (AO.Y + IP.Y * FXATY(IP.X))$$

$$PP.X = CENTER.X + \cos(-SK)*(TMP.X-CENTER.X) - \sin(-SK)*(TMP.Y-CENTER.Y)$$

The Y coordinate of the predicted point is computed in a similar manner.

To account for non-linear distortions in the scanned image relative to the ideal image, the average offset AO.X can be replaced with a computed offset value CO.X that takes into account a weighted sum of the local variations in the offset values for the fiducial markings. In the X direction CO.X can be computed in accordance with the pseudocode shown in Table 1. SUMDIST, DD, TOTDD and TOT.X are temporary variables. Again, the Y coordinate of the predicted point is computed in a similar manner.

TABLE 1

```
SUMDIST=0
  for (each ideal fiducial marking, IF)
   SUMDIST=SUMDIST+(distance from IP to IF)
TOT.X=0
TOTDD=0
for (each fiducial marking, ideal (IF) and
corresponding actual (SF) {
   DD=SUMDIST/(distance from IP to IF, squared)
   TOTDD=TOTDD+DD
   TOT.X=TOT.X+DD*(SF.X−IP.X*FXATY(IP.Y)))
}
CO.X=TOT.X/TOTDD
```

One advantage of the invention is the ability to provide robust handling of distortion and noise. Another advantage of the invention is that area identification can be accurately performed with any number of fiducial markings at arbitrary but predetermined locations. Consequently, area identification is accurately realized even in situations in which fiducial markings are missing or are unrecognizable. Although the preferred minimum number of located fiducial markings is four (4), the method can be employed, using appropriate methods for deriving the set of image distortion parameters, if at least two fiducial markings are located in approximately diagonally opposing areas of the image. In some instances, it is also possible that areas of the image will be similar in appearance to a fiducial marking and therefore may be falsely identified as a fiducial marking. One application where this may occur is when a preprinted form is written on by a user to indicate particular selections or to provide user information. When small fiducial markings are used, so as to be non-obtrusive to the user, the probability of such similarities and false identifications increases. This is especially so when the fiducial markings are distributed near areas of the surface which are to be marked by the user. Additionally, an advantage of this system is that falsely identified fiducial markings can be eliminated so that processing of the image can continue. A further advantage of the invention is that scanned images which contain non-linear distortions that can not be corrected by a single skew and offset correction can be processed correctly by utilizing the localized difference between detected and ideal fiducial marking locations so as to improve the predicted location accuracy in the area of each marking.

I claim:

1. A method of searching a scanned image of a predetermined type and determining locations therein comprising the steps of:
   a. obtaining a version of said scanned image;
   b. obtaining a representation of an ideally registered image of said predetermined type;
   c. searching each area of a set of predetermined areas of said scanned image for at least one candidate fiducial marking, said candidate fiducial markings from each of said areas forming a set of candidate fiducial markings;
   d. estimating a set of overall image distortion factors for said scanned image, based on a comparison of said candidate fiducial markings with fiducial markings of said representation of said ideally registered image of said predetermined type;
   e. determining, which, if any, of said candidate fiducial markings are located more than a predetermined distance away from their expected location;
   f. if any of said candidate fiducial markings are located more than said predetermined distance away from their expected location, removing from said set of candidate fiducial markings at least one candidate marking that is located more than said predetermined distance away from its expected location;
   g. if any of said candidate fiducial markings were removed from said set of candidate fiducial markings in the immediately preceding step (f) go back to step (d) and repeat steps (d) through (g); and
   h. supplying as an output a location for each fiducial marking of said set of candidate fiducial markings and values of said set of image distortion factors for said scanned image.

2. The method as defined in claim 1 further including the step of computing a predicted location of a selected point in said scanned image for which a position is known in said ideally registered image.

3. The method as defined in claim 1 further including prior to said step of supplying the steps of:
   determining if any markings not currently in said set of candidate fiducial markings should be added to said set of candidate fiducial markings;
   if any fiducial markings are to be added selecting at least one candidate fiducial marking to be added to said set of candidate fiducial markings; and
   adding said selected candidate fiducial markings to said set of candidate fiducial markings.

4. The method as defined in claim 1 wherein said step of determining further includes the step of compensating each location of each of said candidate markings based on said set of overall image distortion factors and comparing each of said compensated locations to a corresponding location of a known fiducial marking in said ideally registered image.

5. The method as defined in claim 1 wherein said step of determining further includes the step of compensating each location of each known fiducial marking in said ideally registered image based on said set of overall image distortion factors and comparing each of said compensated locations to a corresponding location of said candidate markings.

6. The method as defined in claim 1 wherein in said step of removing a single candidate that is furthest outside said predetermined tolerance is removed.

7. The method as defined in claim 1 wherein image skew is a member of said set of image distortion factors.

8. The method as defined in claim 1 wherein image scaling is a member of said set of image distortion factors.

9. The method as defined in claim 1 wherein image offset is a member of said set of image distortion factors.

10. The method as defined in claim 1 wherein in said step of searching, each area is searched for an object within said area having a predetermined probability of being a fiducial marking.

11. The method as defined in claim 2 wherein said step of computing takes into account non-linear distortions in said scanned image relative to said ideal image.

12. The method as defined in claim 10 wherein said predetermined probability is a highest probability.

13. The method as defined in claim 10 wherein said predetermined probability is a probability determined by comparison of a set of characteristics of each object found in said search object relative to said set of characteristics of a fiducial marking located in said predetermined area in said ideally registered image.

14. The method as defined in claim 13 wherein a member of said set of characteristics is shape.

15. The method as defined in claim 13 wherein a member of said set of characteristics is location.

16. Apparatus for searching a scanned image of a predetermined type and determining locations therein comprising the steps of:
   means for obtaining a version of said scanned image;
   means for obtaining a representation of an ideally registered image of said predetermined type;
   means for searching each area of a set of predetermined areas of said scanned image for a candidate fiducial marking, said candidate fiducial markings from each of said areas forming a set of candidate fiducial markings;
   means for estimating a set of overall image distortion factors for said scanned image, based on a comparison of said candidate fiducial markings with fiducial markings of said representation of said ideally registered image of said predetermined type;
   means for determining, which, if any, of said candidate fiducial markings are located more than a predetermined distance away from their expected location;
   means responsive to said means for estimating and said means for determining for removing from said set of candidate fiducial markings at least one candidate that is located more than said predetermined distance away from its expected location;
   means for supplying as an output a location for each fiducial marking of said set of candidate fiducial markings and values of said set of image distortion factors for said scanned image.

* * * * *